United States Patent
Porat

[19]

[11] Patent Number: 6,057,606
[45] Date of Patent: May 2, 2000

[54] METHOD AND SYSTEM FOR POWER GENERATION FROM HUMID AIR

[75] Inventor: Itzhak Porat, Haifa, Israel

[73] Assignee: Armament Development Authority, Ministry of Defence, The State of Israel, Haifa, Israel

[21] Appl. No.: 09/167,064

[22] Filed: Oct. 6, 1998

[30] Foreign Application Priority Data

Oct. 12, 1997 [IL] Israel ........................................ 121950

[51] Int. Cl.⁷ ............................................... F03D 9/00
[52] U.S. Cl. ................................. 290/55; 290/54; 60/645
[58] Field of Search ............................... 290/43, 44, 54, 290/55; 60/645

[56] References Cited

U.S. PATENT DOCUMENTS

| | | | |
|---|---|---|---|
| 3,436,908 | 4/1969 | Van Delic | 60/26 |
| 3,894,393 | 7/1975 | Carlson | 60/641 |
| 3,936,652 | 2/1976 | Levine | 290/2 |
| 4,499,034 | 2/1985 | McAlister, Jr. | 261/109 |
| 4,801,811 | 1/1989 | Assaf et al. | 290/55 |

OTHER PUBLICATIONS

Oliver, et al., Energy From Humid Air, South Dakota School of Mines and Technology, Rapid City, S.D. (pp. 63–64), Jan.–Feb. 1978.

D. Zaslavsky, *Snap Technology*—A Major Source of Low Cost Electric Power and Desalinated Water: Utilizing Hot Desert Air and Sea Water as Clean Sources of Energy, Technion–Israel Institute of Technology, 3$^{rd}$ Revision, Jun. 1995.

*Primary Examiner*—Nicholas Ponomarenko
*Attorney, Agent, or Firm*—Cowan, Liebowitz & Latman, P.C.; William H. Dippert

[57] ABSTRACT

A system for the generation of power from an air flow is disclosed, comprising means for the condensation of air by spraying water at high altitude in the open, and at least one wind turbine for the generation of electric power, located substantially at Earth surface level. Condensation of the air at high altitudes generates a downwardly air flow, and said wind turbine is actuated by said air flow to produce electric energy.

11 Claims, 1 Drawing Sheet

METHOD AND SYSTEM FOR POWER GENERATION FROM HUMID AIR

FIELD OF THE INVENTION

The present invention relates to power generation. More particularly it relates to a method and means for power generation by converting the energy of high altitude humid air into mechanical energy.

BACKGROUND OF THE INVENTION

It is known that a vast amount of energy is contained in the latent heat of vaporization of water vapor in humid air.

In U.S. Pat. No. 3,894,393 (Carlson) a method and means for the generation of power from a controlled air flow was disclosed. An enclosed air mass is cooled at high altitude, below the temperature of the surrounding air. This is done by spraying water, optionally pumped from the sea to the top of a large duct, into the air, at the desired altitude. The treated air is isolated from the surrounding air by means of a large duct. The resulting cooler, denser air flows down the duct toward lower altitude, and the energy of the falling air mass is extracted by means of a turbine generator. It was stated that the net power output of the system is the gross power available from the turbine minus the power to pump the water and the power loss in duct drag and emerging air kinetic energy.

Research was conducted in the late seventies by T. K. Oliver and others (Energy from Humid Air, T. K. Oliver et al., J. Energy, Vol. 2, No. 1, January-February 1978, p. 63), primarily by computer modeling, to investigate the concept of converting the energy in humid air into mechanical work (i.e. to drive an electrical generator). It was stated in the aforementioned research that the proposed process is to be thought of as a heat engine with the air itself acting as the working fluid.

The idea of processing the humid air in order to recover the latent heat of vaporization is attractive considering the following standpoints (as stated in the research). The energy of the sun is virtually limitless, and it is known that some 35% of the solar energy that reaches the Earth's surface is used to evaporate water. The collector of the solar energy exists in nature in the form of oceans or tropical rain forests. With any reasonable air circulation the system will operate as an energy conversion plant. Fresh water is obtained as a by-product in the process.

The research put forward some preliminary stipulations. First, the humid air itself is to be the working fluid (of the heat engine), and second, the process has to be of continuous-flow with the air passing through ducts and turbines, as necessary. It was argued that it will not be possible to attain high efficiency in converting latent heat of vaporization into useful work, however this was not the important consideration since humid air is free and plentiful. On the other hand, a most important consideration was the energy output compared to unit of plant investment and operating cost. If this proved favorable then a low conversion efficiency would be tolerable. The proposed process of humid air power generation in the research was called "Natural Draft Tower". It was described as a vertical, natural draft, condensation tower. The efficiency of such a tower was claimed to be dependent upon the degree of saturation of the ambient air at the upper inlet, upon the tower height and upon the prevailing atmospheric temperature lapse rate.

Carlson's invention was the basis for Prof. Dan Zaslavsky's proposed SNAP (SNeh Areo-electric Power) project (Zaslavsky D. (1995) "SNAP Technology—A major source of low cost electric power and desalinated water", Technion-Israel Institute of Technology). In the SNAP project it was proposed to erect power plants in desert areas for the generation of electric power with the method described by Carlson, using sea water, and obtaining desalinated water, as a by-product.

In U.S. Pat. No. 4,801,811 (Assaf et al.) it was described a method and a system for generating electricity in an arid environment. Electricity is generated using an open duct such as a canyon that is closed at one end, and open at the other by erecting an air dam at the open end of the canyon, and locating an air turbogenerator in the base of the dam. The air in the canyon is cooled by spraying water into the air as it enters the canyon. The cooled air then flows downwardly toward the base of the dam and through the turbogenerator. The air dam described by Assaf consisted a flexible curtain, suspended at its top by suspension means like a cable suspended between towers erected on both sides of the canyon's open end.

However, the method described by Oliver, Carlson's invention, Assaf's invention and the proposed SNAP project all seem to have some serious drawbacks. First, with the exception of Assaf's invention, they all require the existence of an extremely high tower or duct, with a very large diameter. The proposed tower height is in the order of a thousand (or even several thousand) meters. Its proposed diameter is in the order of hundred, or several hundred, meters. Such a tower has never been built before. This inevitably involves complex engineering considerations and problems, and heavy erection costs. Second, sea water transportation to desert or other inland locations requires the establishment of a system of water pipes and pumping stations along the pipes, and this too is very costly.

Assaf's invention on the other hand, required the existence of a canyon and the erection of an air dam at the open end of a canyon. It is argued that canyons that would suite Assaf's requirements are not widely available, and furthermore the erection of an air dam according to Assaf's invention is in itself a costly engineering challenge. It should be noted that a canyon suitable for such an operation is to be relatively steep if it is to effectively serve its purpose.

Another drawback is the creation of vast amounts of salt which constitutes an environmental hazard to the soil, and this is why such power plants are preferably located in remote isolated desert locations. Such a location increases water transportation costs, and subsequently, also increases the costs of long power lines, supplying the generated electricity to the consumers.

It is the object of the present invention to provide a method and means for the generation of power from humid air which is cheaper and more practical than the methods and means described in the prior art.

Another object of the present invention is to provide a method and means for the generation of power from humid air which does not require the erection of an air tower or the employment of a duct.

BRIEF DESCRIPTION OF THE INVENTION

A system for the generation of power from an air flow, comprising means for the condensation of air by spraying water at high altitude in the open, and at least one wind turbine for the generation of electric power, located substantially at Earth surface level, wherein the condensation of the air at high altitude generates a downwardly air flow, and wherein said wind turbine is actuated by said air flow to produce electric energy.

DETAILED DESCRIPTION OF THE INVENTION AND FIGURE

Figure 1:
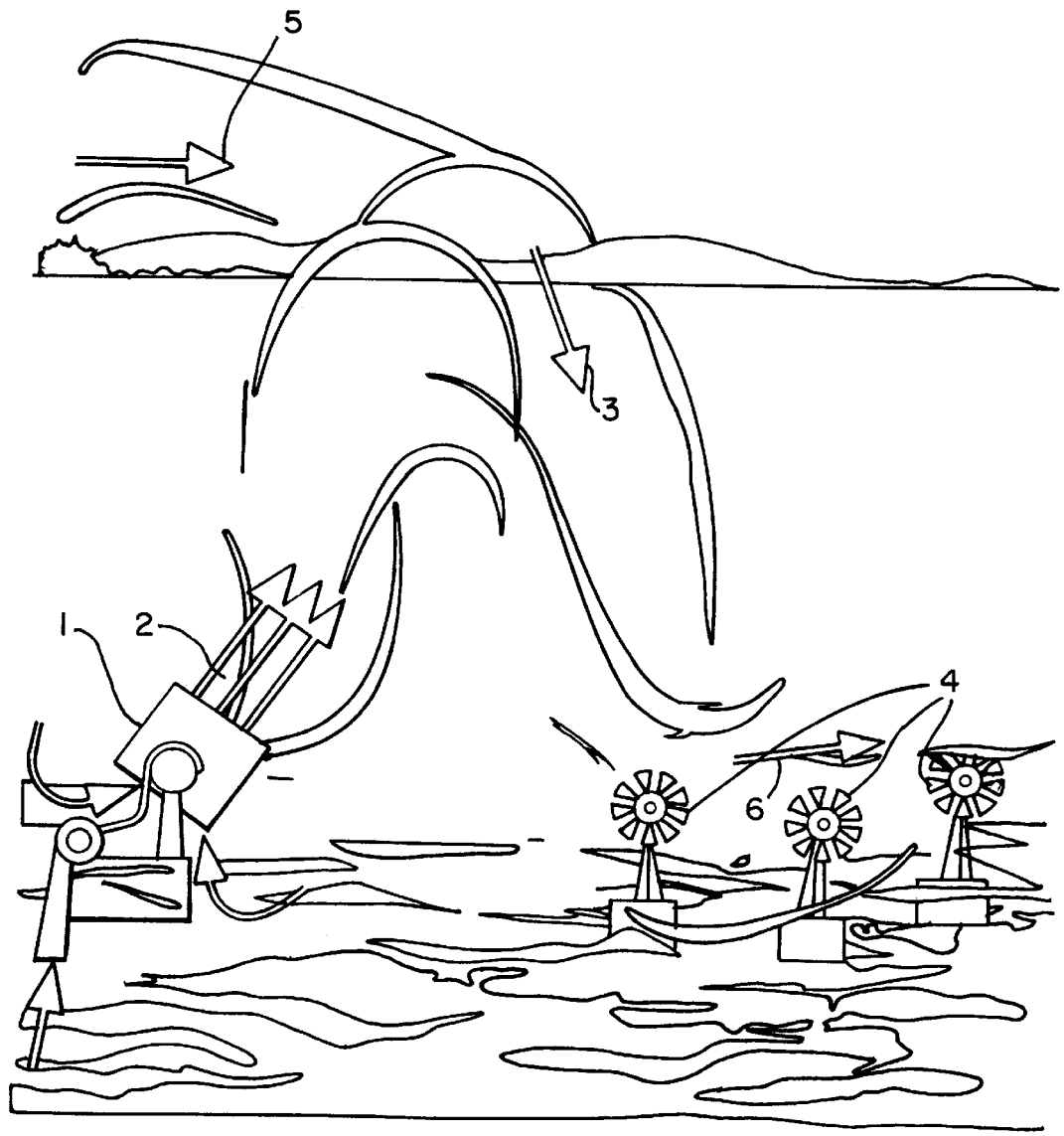
FIG. 1 illustrates a schematic rendering of the system for the generation of electric power from humid air in the open of the present invention, located off shore at sea.

The principles of generation of electric power from humid air in open are known. Water drops which are sprayed onto unsaturated air evaporate and air-cooling results. The potential temperature drop is about 20° C., and depends on air conditions (temperature, relative humidity). The cooled air acquires vertical velocity and generates a vertical air flow. This air flow is used to actuate a wind turbine for the generation of electricity. Prior art literature stipulated the need for a physical duct through which the cooled air was to flow in order to facilitate the actuation of wind turbines. This meant erecting a high rising tower, or utilizing physical land features, such as a canyon. In the present invention no such duct is required.

FIG. 1 illustrates a typical embodiment of the system for the generation of electric power from humid air in the open of the present invention, located off shore at sea. The system for the generation of power from an air flow, according to the present invention, employs means for the condensation of the air due to the spraying of water at high altitudes in the open. This is achieved by means of a water cannon (1) located at ground or sea level which sprays a jet of water mixed with air(2) up to the desired high altitude. Optionally this is achieved by means of a high-rising water pipe which elevates the water to the desired altitude and is followed by spraying of water. The altitudes considered are of the order of several thousand meters, preferably not below 1000 meter. The condensation of the relatively dry air at these high altitudes results in the flow of the heavier condensed air downwards (3). The horizontal component of the condensed air vertical flow is than captured by a plurality of wind turbines (4) located substantially at sea level, and results in the generation of electricity by the wind turbines.

As the system operates in the open air, a natural horizontal wind may be present (5). The natural horizontal wind velocity is greater than the natural wind at surface level. As the condensed air is brought down in the process of the present invention, it acquires a horizontal component (6), which can actuate horizontally oriented wind turbines.

It is evident that the natural horizontal high altitude wind is not unidirectional, and can blow in all directions, or even change direction from time to time, and therefore the wind turbines, optionally mounted on maneuverable platforms can be relocated and/or reoriented and placed at desired positions to face the wind. The water cannon itself can be relocated and/or directed at different directions, as the wind direction changes, thus controlling to a certain extent the direction of the produced horizontal component of the vertically downward flowing air. If the whole system is located off shore than the turbines can be mounted on maneuverable floating platforms, and anchored at the desired locations. In the event of a sudden wind direction change, it is relatively easy and quick to move the turbines and relocate them appropriately. Basic calculations show that when water is raised up to an altitude of 914 m above sea level, and sprayed over an area of 500 m in diameter, in a rate of 5 tons of water per second, power of 72 MW can be generated, assuming a 50% efficiency rate for the wind turbines.

Results of an exemplary parametric study are shown in the table bellow, for a typical height of 914 meters.

| No. | m $H_2O$ ton/s | $H_{inj}$ [m] | $R_{inj}$ [m] | Injection Profile [m] | $V_{max}$ [m/s] | $V_{av}$ [m/s] | $m_{air}$ ton/s | $mv^2/2$ MW | $P_{loss}$ MW |
|---|---|---|---|---|---|---|---|---|---|
| 1 | 5 | 914 | 200 | Linear 0–200 | 16.22 | 11.3 | 1539 | 98 | 45 |
| 2 | 5 | 914 | 200 | Step 100–200 | 16.12 | 11.31 | 1545 | 99 | 45 |
| 3 | 5 | 914 | 200 | Step 0–200 | 16.40 | 10.80 | 1445 | 84 | 45 |
| 4 | 5 | 500 **?? | 200 | Linear 0–200 | 12.3 | 8.84 | 1156 | 45 | 24.5 |
| 5 | 5 | 914 | 250 | Linear 0–200 | 15.9 | 10.5 | 2129 | 117 | 45 |
| 6 | 10 | 914 | 200 | Linear 0–200 | 18.6 | 12.84 | 1735 | 145 | 90 |
| 7 | 10 | 914 | 250 | Linear 0–250 | 17.75 | 11.9 | 2444 | 173 | 90 |
| 8 | 10 | 914 | 400 | Linear 0–400 | 15.00 | 10.67 | 3568 | 240 | 90 |
| 9 | 20 | 914 | 200 | Linear 0–200 | 21.2 | 14.45 | 1929 | 203 | 180 |
| 10 | 20 | 914 | 200 | Linear 100–200 | 19.82 | 14.48 | 1941 | 204 | 180 |
| 11 | 20 | 914 | 200 | Step 0–200 | 19.8 | 14.48 | 1941 | 204 | 180 |
| 12 | 20 | 914 | 250 | Linear 0–250 | 20.3 | 13.5 | 2695 | 245 | 180 |
| 13 | 20 | 914 | 300 | Linear 0–300 | 18.8 | 13.95 | 3418 | 288 | 180 |
| 14 | 20 | 914 | 400 | Linear 0–400 | 16.54 | 13.28 | 4128 | 364 | 180 |

The main advantage of the present invention is the absence of any construction such as a large duct or a tower which was essential in the methods and means described in the prior art. This reduces significantly the erection costs of the system, as it is estimated that a 1 km high tower, 500 m wide in diameter, may cost up to 1 billion dollars.

The present invention provides a process and means for the generation of power from humid air which is cheaper and more practical than the methods and means described in the prior art. Off shore sea water is readily available and transportation of water to remote desolated places becomes superfluous. Furthermore, the resulting salt by-product poses no environmental threat at sea.

The present invention offers a substitute, environmental friendly, non fossil energy source, which is both cheap, available, and may even be coupled with the desalination of sea water as a low cost by-product.

It should be clear that the description of the embodiments and attached Figures set forth in this specification serves only for a better understanding of the invention, without limiting its scope as covered by the following Claims.

It should also be clear that a person skilled in the art, after reading the present specification could make adjustments or amendments to the attached Figure and above described embodiments that would still be covered by the following Claims.

What I claim is:

1. A system for the generation of power from an air flow, comprising means for the condensation of air by spraying water at high altitude in the open using water cannon located at Earth surface level, and at least one wind turbine for the generation of electric power, located substantially at Earth surface level, wherein the condensation of the air at high altitude generates a downwardly air flow, and wherein said wind turbine is actuated by said air flow to produce electric energy.

2. A system according to claim 1, wherein said water cannon sprays water in a jet of water mixed with air up to the desired high altitude.

3. A system according to claim 1, wherein said water cannon can be relocated and/or reoriented at different directions.

4. A system according to claim 1, wherein said altitudes are preferrably in the order of several thousand meters.

5. A system according to claim 4, wherein said altitudes are not below 1000 meters.

6. A system according to claim 1, wherein a plurality of wind turbines is used.

7. A system according to claim 1, wherein said wind turbine can be relocated and placed at desired predetermined locations, facing wind direction.

8. A system according to claim 1, wherein said system is located off shore.

9. A system according to claim 1, wherein said wind turbine is mounted on a maneuverable platform.

10. A system according to claim 8, wherein said wind turbine is mounted on a maneuverable floating platform.

11. A method for the generation of power from an air flow comprising the following steps:

condensing air by spraying water at high altitudes in the open air using a water cannon located at Earth surface level;

subsequently generating a vertical flow of air downwardly towards Earth surface level; and actuating of wind turbines by said generated vertical air flow.

* * * * *